US007907954B2

(12) United States Patent
Poyhonen et al.

(10) Patent No.: US 7,907,954 B2
(45) Date of Patent: Mar. 15, 2011

(54) SYSTEM AND METHOD FOR DYNAMIC INTERFACE MANAGEMENT

(75) Inventors: Petteri Poyhonen, Helsinki (FI); Ove Strandberg, Lappbole (FI)

(73) Assignee: Nokia Corporation, Espoo (FI)

( * ) Notice: Subject to any disclaimer, the term of this patent is extended or adjusted under 35 U.S.C. 154(b) by 1669 days.

(21) Appl. No.: 11/087,732

(22) Filed: Mar. 23, 2005

(65) Prior Publication Data

US 2006/0217072 A1 Sep. 28, 2006

(51) Int. Cl.
*H04W 72/00* (2009.01)
(52) U.S. Cl. ...... 455/454; 455/401; 455/421; 455/414.3; 370/466; 370/328; 709/250; 709/220; 709/217; 709/224; 709/225; 709/227; 709/230; 719/318; 345/581
(58) Field of Classification Search .................. 455/401, 455/421, 454, 414.3; 370/466, 328; 709/250, 709/220, 217, 224, 225, 227, 230; 719/318; 345/581
See application file for complete search history.

(56) References Cited

U.S. PATENT DOCUMENTS

| 6,725,281 | B1 * | 4/2004 | Zintel et al. ............... 719/318 |
| 7,114,010 | B2 * | 9/2006 | Karaoguz et al. ............ 709/250 |
| 7,313,108 | B2 * | 12/2007 | Scobbie ........................ 370/328 |
| 7,346,341 | B2 * | 3/2008 | Costa-Requena et al. .. 455/414.3 |
| 2002/0052966 | A1 * | 5/2002 | Isomura et al. ............... 709/230 |
| 2002/0059434 | A1 | 5/2002 | Karaoguz et al. |
| 2002/0112058 | A1 * | 8/2002 | Weisman et al. ............. 709/227 |
| 2005/0220139 | A1 * | 10/2005 | Aholainen .................... 370/466 |
| 2006/0075100 | A1 * | 4/2006 | Stirbu ........................... 709/225 |
| 2007/0263007 | A1 * | 11/2007 | Robotham et al. ........... 345/581 |

FOREIGN PATENT DOCUMENTS

CN 1591322 A 3/2003

OTHER PUBLICATIONS

Sep. 23-28, 2002, Shih et al., "Wake on Wireless: An Event Driven Energy Saving Strategy for Battery Operated Devices", MOBICOM '02, Sep. 23-28, 2002.
U.S. Appl. No. 10/951,522, filed Sep. 28, 2004, Stirbu.

* cited by examiner

*Primary Examiner* — Matthew D Anderson
*Assistant Examiner* — April G Gonzales
(74) *Attorney, Agent, or Firm* — Hollingsworth & Funk, LLC

(57) ABSTRACT

A system and method for dynamically instantiating a communication interface between a requesting entity and a client entity. A requesting entity transmits a trigger signal to a control point, where the trigger signal includes a preferred communication configuration. The control point inspects the preferred communication configuration and, if possible, instantiates a communication link that complies with the requested configuration. The communication link is deactivated either in response to a timing function, upon determining that the requesting and client entities have completed their data exchanges, or determining that an amount of time provided for the communication has expired.

40 Claims, 11 Drawing Sheets

SYSTEM AND METHOD FOR DYNAMIC INTERFACE MANAGEMENT

FIELD OF THE INVENTION

This invention relates in general to communication interfaces, and more particularly to a system and method for dynamic allocation of a communication interface based on a triggering event.

BACKGROUND OF THE INVENTION

Mobile telecommunications has seen an explosive growth within just the last decade and is expected to continue this growth trend into the future. Whereas mobile communications began in its infancy stages as primarily providing voice only communications, today's mobile communications has by necessity grown in complexity and capacity to accommodate the increasingly demanding requirements of not only voice transfer, but also data transfer in its many forms, such as messaging and browsing.

As the telecommunications industry develops technology to keep pace with the ever increasing demands of its users, a hybridization of the mobile subscriber's interface to the mobile communications network is taking place. The mobile terminal is transforming from a handheld voice communications device into a data portal that is increasingly being used to provide and consume a growing number of services and applications. As such, the mobile terminal is transforming into a digital assistant that transcends the role of a mobile terminal, by providing increasingly complex mobility functions that are inherently facilitated by the mobile terminal.

Inherent with the growing role of mobile terminals, however, is the growing number of interface capabilities that must be maintained within the mobile terminals to satisfy the communication needs of their owners. For example, along with the standard cellular communication interfaces provided by today's mobile terminals, are other wired interfaces, such as USB or Firewire, and wireless interfaces, such as Bluetooth, Near Field Communication (NFC), and Wireless Local Area Network (WLAN), that are also provided to facilitate the proximity communication functionality of today's mobile terminal.

As the number of communication interfaces increases, however, so does the number of hardware and software resources that are required to facilitate them. Accordingly, the amount of power that is required to operate the resources also increases. Furthermore, if all supported interfaces are required to be active while the mobile terminal is powered on, then a cumulative power drain is created with each interface that is activated. Still further, with each interface that is kept active, the security risk and radio interference caused by each active interface potentially increases.

An exemplary network in which a number of devices having a number of concurrently active interfaces is a Personal Area Network/Body Area Network (PAN/BAN). A PAN is the interconnection of information technology devices within a proximity range to one another to form an ad hoc network. For example, a laptop computer, a Personal Digital Assistant (PDA), and a portable printer brought within several meters of one another may be wirelessly linked to automatically form a PAN, where each device may have one or more interconnection technologies available to it. A BAN is a particular implementation of a PAN, whereby for example, independent nodes, or sensors, that may be located within proximity to a person, e.g., within his or her clothing, are interconnected. A design goal of a BAN is the support of a high density of heterogeneous nodes per person (about 50 per body) with data rates ranging from several hundred to several million bits per second. It can be seen, therefore, that a burdensome interface management task may quickly develop within a PAN/BAN, when multiple devices having a number of controllable interfaces are triggered to form the network.

Prior art solutions for interface management of mobile terminals have focused on providing the capability to manually activate or deactivate the interface as required. Other prior art solutions provide service and radio technology specific solutions to deactivate a communications interface, but are not generally applicable to activate/deactivate any or all of the communications interfaces on the mobile terminal as desired. For example, a prior art radio transmitter for a Time Division Multiple Access (TDMA) communication system may be configured to activate just prior to the transmission timeslot that is allocated for that transmitter and deactivate just subsequent to transmission during the allocated transmission timeslot, but does not allow the TDMA communication system itself to be activated or deactivated. Generally speaking, configuration of prior art communication interfaces requires a static operation that is manually implemented to either activate or deactivate the interface.

Accordingly, there is a need in the communications industry for dynamic activation/deactivation control of communication interfaces within a mobile terminal. A further need exists for a system and methodology that provides added security and reduced risk of interference through activation/deactivation of communication interfaces in response to the operational environment surrounding the mobile terminal. The present invention fulfills these and other needs, and offers other advantages over the prior art communication interface control approaches.

SUMMARY OF THE INVENTION

To overcome limitations in the prior art described above, and to overcome other limitations that will become apparent upon reading and understanding the present specification, the present invention discloses a system and method for dynamically instantiating a communication link between a requesting entity and a client entity. The requesting entity provides a preferred communication configuration to the client entity, which may or may not be accommodated by the client entity due to its communication capabilities. Thus, the communication link is only activated during the time that the communication link is actually required.

In accordance with one embodiment of the invention, a method of activating at least one communication link between a requesting entity and a client entity comprises receiving a trigger signal by a control point associated with the client entity, analyzing communication parameters contained within the trigger signal to determine compatibility of the client entity with the communication parameters, applying a timing function in response to a positive determination of compatibility, activating the at least one communication link in accordance with the communication parameters and the timing function, and deactivating the at least one communication link in accordance with the timing function.

In accordance with another embodiment of the invention, a communication system provides at least one communication link between a client entity and a requesting entity in response to a trigger signal sent from the requesting entity. The system comprises a client entity that is coupled to receive the trigger signal and is adapted to activate the at least one communication link in response to the trigger signal. The client entity includes an interface that is adapted to receive the trigger signal, a receiver that is coupled to the interface and is adapted to parse the trigger signal to obtain communication configuration parameters associated with the at least one communication link, and an execution environment that is coupled to the receiver and is adapted to instantiate operation of the at least one communication link in accordance with the communication configuration parameters. The at least one communication link is activated from a previously deactivated state.

In accordance with another embodiment of the invention, a computer-readable medium having instructions stored thereon which are executable by a communication device for providing on-demand communication links. The instructions perform steps comprising receiving a request to activate a communication link, parsing the request to obtain a preferred communication configuration, comparing the preferred communication configuration to a set of predetermined communication configurations, and activating the communication link having a communication configuration equivalent to the preferred communication configuration in response to a positive comparison.

In accordance with another embodiment of the invention, a communication device comprises an interface adapted to receive a trigger signal containing communication link definitions, a receiver coupled to the interface that is adapted to parse the communication link definitions, a logic block coupled to receive the parsed communication link definitions that is adapted to compare the communication link definitions to communication configuration capabilities associated with an execution environment; and a timer block coupled to the logic block. The timer block initiates a timing function that activates the execution environment in response to a positive match between the communication configuration capabilities and the communication link definitions.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figures 1A, 1B:
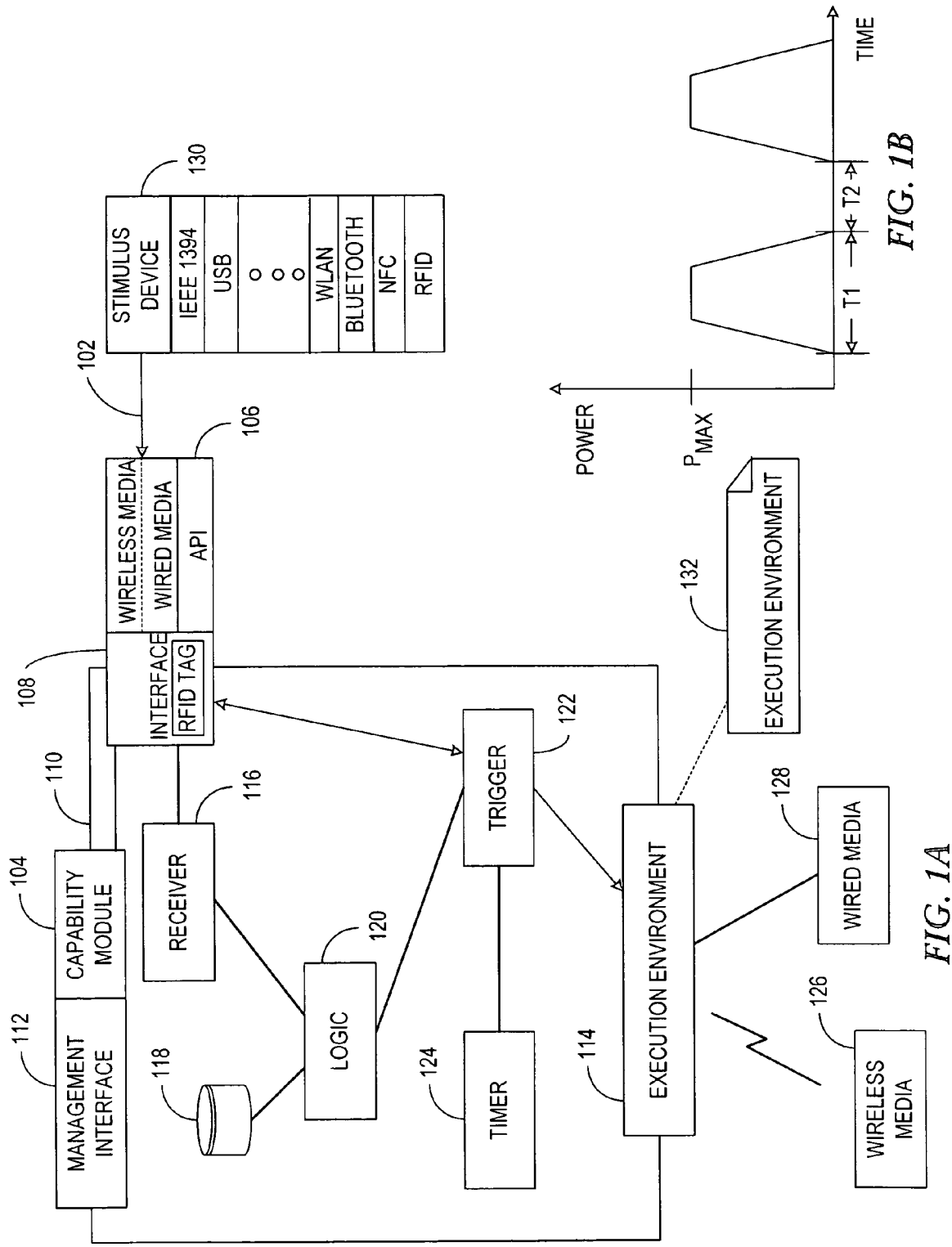
FIG. 1A illustrates a logical model for an interface management system in accordance with the present invention.
FIG. 1B illustrates a timing function in accordance with the present invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a system and method for dynamic communication interface configuration in response to a triggering event. The triggering event may be generated by virtually any device or application that is operating either internally or externally to the device being configured. The triggering event may contain configuration information adequate to uniquely request one or more communication interfaces within either a mobile, or a non-mobile, device and to subsequently configure each communication interface for activation or deactivation as required. The triggering event may also contain information adequate to uniquely request activation or deactivation of one or more communication interfaces within a network consisting of multiple communication devices each having multiple communication access capability.

In the event that the mobile, or non-mobile, device has more than one communication interface available for a particular communication scenario, then the triggering event may also contain configuration information that is effective to enable one particular communication interface that is most applicable for that scenario. For example, configuration information contained within the triggering event may call for a proximity interface having a relatively low transfer rate to accommodate communicating entities that are only a few centimeters away from one another. The triggering event may thus enable an NFC link to be established between the two communicating entities, as opposed to establishing, for example, a higher speed Bluetooth, or WLAN, link between the communicating entities. In such an instance, the configuration information contained within the triggering event is effective to select a more power efficient mode of communication, since even though the WLAN and Bluetooth modes of communication are available, the NFC communication link is preferred due to the relatively low transfer rate required between the communicating entities. Thus, by choosing the NFC link over the Bluetooth or WLAN links, the optimal communication environment is selected in response to the configuration information provided by the triggering event.

It can be seen, therefore, that through the activation of one or more communication links only at the time that the communication links are actually required, many advantages may be realized, such as the reduction of radio interfaces that are unnecessarily left in their activated state. Optimization of power consumption, for example, may be realized since each of the communication interfaces may be kept in a powered off state, or alternately in a reduced power consumption mode, i.e., "sleep" mode, until the particular communication interface is required. In addition, the communications terminal may be equipped with multiple access capability, e.g., Bluetooth, WLAN, and NFC, thus allowing adaptability of the communication terminal in response to its environment.

Wired access capabilities within the communication device may also be available. For example, if a particular device within an ad-hoc network only supports IEEE 1394 serial communications, then the communications terminal may be configured through the triggering event to activate its IEEE 1394 serial interface in preparation for an upload/download session with the ad-hoc device and to deactivate the IEEE 1394 serial interface once the session has completed. Alternately, should a Universal Serial Bus (USB) enabled device within the same ad-hoc network require service, then a USB interface within the communication terminal may instead be activated/deactivated in response to a triggering event as required.

Other advantages are similarly realized through operation of the present invention. For example, security risks associated with denial of access (DOA) attacks may be minimized. Further, security risks associated with unauthorized access to the various communication interfaces is minimized, since the number of opportunities for the unauthorized access to the communication interfaces is decreased. For example, while prior art, Bluetooth enabled communication devices may offer Bluetooth functionality 24 hours a day, a Bluetooth enabled communication device in accordance with the present invention may only offer Bluetooth communications on demand in response to a triggering event. Thus, the security risk for that Bluetooth interface is diminished in direct proportion to the ratio of the actual time that the Bluetooth interface is activated to the remaining time that the Bluetooth interface is deactivated. Any radio interference, or battery drain, that may be associated with a particular communication interface may similarly be reduced by the same ratio.

FIG. 1A exemplifies a model for an interface management system in accordance with the present invention. As discussed above, communication device 110 may be represented either by a wireless, or wired, communication device and may be either mobile, or non-mobile. Thus, wireless media and/or wired media may be used to transmit trigger signal 102 to interface 108 from stimulus device 130. In response to receiving trigger signal 102, execution environment 114 may be configured for communications with wireless media 126 and/or wired media 128 accordingly. In alternate embodiments, execution environment 114 may exist in other devices that are external to communication device 110, such that trigger signal 102 may be effective to activate the wired/wireless interfaces that implement execution environment 114 in those devices as required. Additionally, trigger signal 102 may be effective to "wake-up" an entire network. As discussed in more detail below, trigger signal 102 may be a Session Description Protocol (SDP) message sent via any one of a number of transmission mediums, such as WLAN, Bluetooth, or RFID, to name only a few.

It should be noted, that while wireless/wired interface mediums external to communication device 110 may be used by external stimulus devices to transmit trigger signal 102, trigger signal 102 may also be provided from within communication device 110. In accordance with one embodiment, Application Program Interface (API) 106 may process events occurring internally to communication device 110, either through manual events initiated by a user of communication device 110, or automated events initiated by applications executing peripherally to communication device 110. The response of API 106 to those events may then be effective to activate execution environment 114 for a given communication protocol and communication medium.

For example, execution environment 114 may be configured by internal API 106, in conjunction with triggers 122 and timers 124, to "wake up" upon expiration of timer 124 so that the existence of any communication devices wishing to communicate with communication device 110 may be discovered within a predetermined time window as illustrated in FIG. 1B. During the predetermined time window as illustrated in time window T1, for example, the appropriate wired, or wireless, execution environment is activated, during which time any communication devices wishing to communicate with communication device 110 are detected. In such an instance, communication with either of wired media 128 and/or wireless media 126 may be initiated in response to the timed triggering event issued by API 106.

If during the predetermined time window, no communication devices are detected, then execution environment 114 may be instructed to "sleep" by API 106, in conjunction with triggers 122 and timers 124, which may then be effective to deactivate any communication interfaces that may be operating according to execution environment 114 during a sleep interval denoted by T2. It should be noted that the timing function as illustrated in FIG. 1B may be configurable, such that the start time and duration of wake-up period T1 and the start time and duration of sleep period T2 may be fully programmable as required. For example, radio specific features of execution environment 114 may dictate a power save mode, whereby transmission only occurs during specific windows of time. In such an instance, the timing function of FIG. 1B may be adapted in accordance with the radio specific features, such that the timing function corresponds to the particular power save schedule that is implemented by the radio interface. As a default, the timing function may depend upon the radio specific power save schedule, as this schedule may represent the most efficient power savings that are obtainable.

Period T1 may denote the amount of time that a particular communication interface is activated, whereby a peak power drain, $P_{MAX}$, is consumed during such time. Similarly, period T2 may denote the amount of time that the same communication interface is deactivated, whereby substantially no power is consumed. Thus, in response to trigger signal 102, the corresponding execution environment 114 is transitioned from a powered-off state, e.g., sleep state, to a powered-on state, e.g., awake state, during the T1 activation time denoted in FIG. 1B. Similarly, one the execution environment 114 has been utilized, it is transitioned from the awake state to the sleep state during the T2 deactivation time as denoted in FIG. 1B.

It can be seen, therefore, that the amount of power consumed by communication device 110 during periods T1 and T2 is directly proportional to the duration of periods T1 and T2 during the timed function operation. Similarly, by randomly modifying the schedule in which communication device 110 is activated, additional security measures may be invoked, since unfriendly devices that are unfamiliar with the schedule are somewhat hampered when attempting, for example, denial of service (DOS) attacks on communication device 110.

In one embodiment, trigger signal 102 initiated by stimulus device 130 contains a set of configuration parameters that are effective to define an appropriate execution environment 114 that may be used during the requested communication session. In such an instance, a subset of preferred communication media, nodes, and protocols may be included within the trigger signal to define such an execution environment. The set of configuration parameters may be parsed from trigger signal 102 by receiver 116 and subsequently provided to logic block 120 for comparison with communication configurations, stored within database 118, that are available for instantiation by execution environment 114. Should the available communication configurations stored within database 118 match one or more of the configuration parameters received in trigger signal 102, then trigger 122 and timer 124 combine to activate execution environment 114 in accordance with the requested communication configuration.

For example, trigger signal 102 may define that a Bluetooth connection is desired and that a Bluetooth session is to be expected to be executed by execution environment 114 within a predetermined time window established by timer 124 and trigger 122. During the predetermined time window, execution environment 114 may then activate and wait for a Bluetooth access request from wireless media 126 for the commencement of the Bluetooth session as requested by trigger signal 102. As will be discussed in more detail below, other "on-demand" communication scenarios exist in accordance with the present invention.

Management interface 112 may be used to configure communication device 110 for operation in accordance with the present invention. For example, definitions of communication media, nodes, and protocols may be downloaded to management interface 112 to be subsequently stored within database 118. Such downloads may then be used in combination with logic 120 to define the various instantiations of execution environment 114 that may be supported by communication device 110. In addition, receiver 116 may be configured to accept the various stimulus signals from interface 108 as is required to control operation of execution environment 114. In addition, management interface 112 may interact with interface module 108 and capability module 104 to report the communication capabilities of communication device 110 to requesting third party devices, e.g., stimulus device 130, so that those third parties may formulate an appropriate trigger signal 102 having a requested communication configuration that is compatible with execution environment 114 of communication device 110.

For example, communication device 110 may be equipped with transponders that use electromagnetic/electrostatic coupling in the radio frequency portion of the electromagnetic spectrum, such as Radio Frequency Identification (RFID), to report its capabilities. The transponders or "tags" may be located within interface 108 and are activated by radio frequency waves emitted by stimulus device 130. Once activated, the tag transmits communication configuration information to a reader module (not shown) associated with stimulus device 130.

More particularly, one embodiment of the invention involves reading transponders (tags) based on RFID technology, which utilizes electromagnetic or electrostatic coupling in the radio frequency (RF) portion of the electromagnetic spectrum. An RFID reader system (not shown) associated with stimulus device 130 includes at least an antenna and transceiver. An RF signal is transmitted from the RFID reader of stimulus device 130 that activates the tags when physically within a predetermined range of the tags. When a tag has been activated, it transmits information back to the RFID reader of stimulus device 130. More particularly, in the case of a passive tag, the tag may be energized by a time-varying electromagnetic RF wave generated by the RFID reader. When the RF field passes through the antenna coil associated with the tag, a current is generated through the coil. This current is ultimately used to power the tag, and make possible the tag's return transmission of information (e.g., communication configuration information of communication device 110) to the reader, sometimes referred to as backscattering. For example, the tag information may be stored in database 118, which can be retrieved and transmitted when the tag is energized. It should be noted, that the tag information that is communicated may include only a subset of information, i.e., partial disclosure of its communication capabilities that may be located within database 118.

In another embodiment, stimulus device 130 may identify the communication capabilities of communication device 110 via a short-range wireless technology such as Bluetooth. Bluetooth is a computing and telecommunications industry specification that describes how mobile phones and other mobile terminals can interconnect with each other and with home and business phones/computers using a short-range wireless connection. Stimulus device 130, such as a mobile phone, PDA, laptop computer, personal computer (PC), or the like may be configured to extract communication configuration information from communication device 110 via Bluetooth or other similar short-range technology. Thus, in accordance with the invention, the communication capabilities of communication device 110 contained within database 118 may be discovered by stimulus device 130 via a Bluetooth exchange with interface 108.

In another embodiment, stimulus device 130 may identify the communication capabilities of communication device 110 via a short-range wireless technology such as WLAN. WLAN, or generally "Wireless Networking", refers to a technology that allows computers and other network devices to have network connectivity using radio waves. For example, IEEE 802.11 technologies are representative examples of current wireless network technologies allowing stimulus device 130, such as a mobile phone, PDA, laptop computer, PC, or the like to be configured to extract communication capability information from communication device 110. Stimulus device 130 and communication device 110 may each include a wireless network adapter that includes a transceiver to communicate wirelessly with the network, such as via a wireless access point (WAP), so that the communication capability information associated with communication device 110 may be exchanged with stimulus device 130 via interface 108.

In another embodiment, the short messaging service (SMS) may be used to supply the triggering signal, whereby the SMS messages that are used for triggering may also contain information about the desired communication capabilities of device 110. While communication device 110 may provide the communication link(s) as desired, it should also be noted that communication device 110 is not required to implement the communication capabilities locally. In particular, communication device 110 may act solely as a control point for other communication devices having communication capabilities that are represented by execution environment 132. By providing the communication services reflected in the capability indicators received in the SMS message, it is sufficient that communication device 110 has control over those devices that can provide the requested capabilities.

Figure 2:
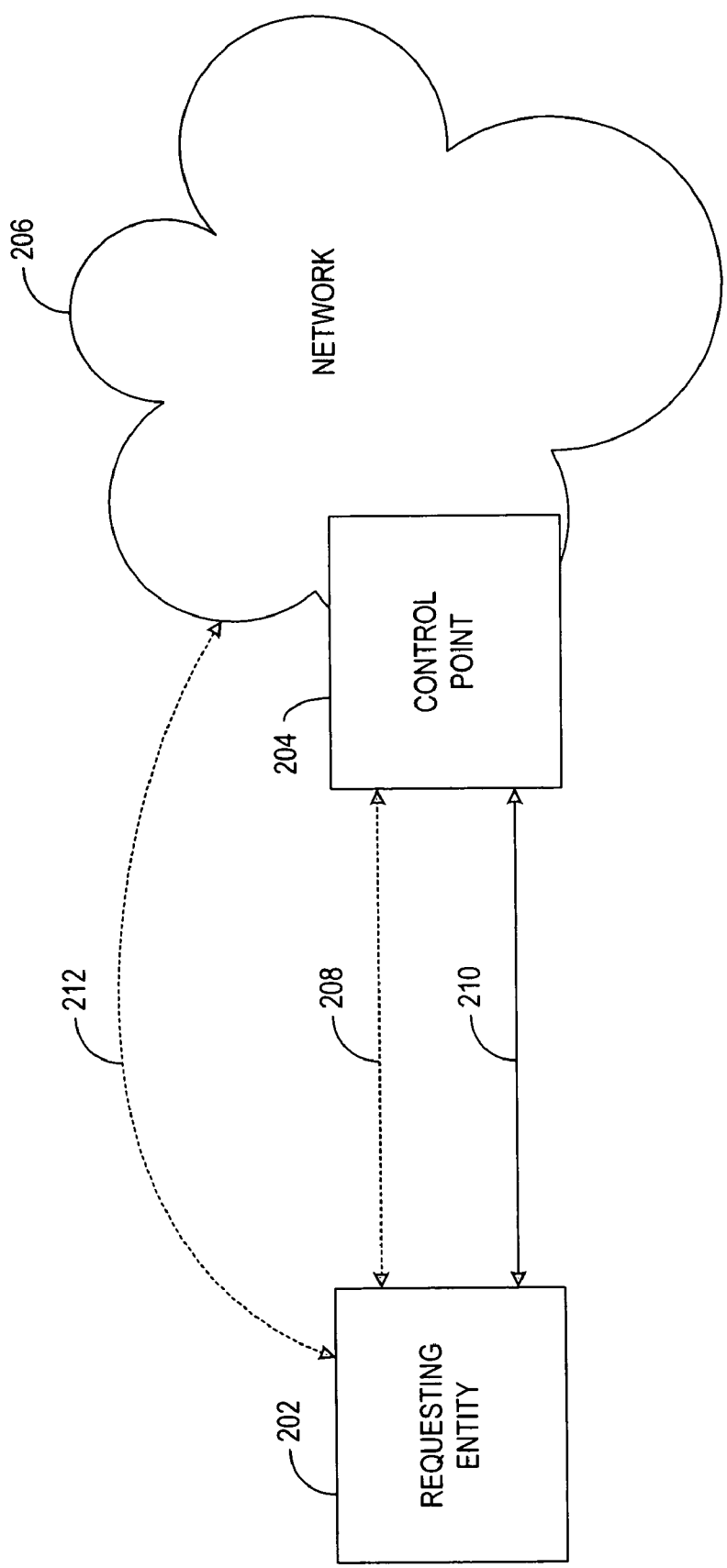
FIG. 2 illustrates a communication block diagram in accordance with one embodiment of the present invention.

In one embodiment, communication device 110 may be the actual device with which stimulus device 130 communicates initially via a control path in order to request one or more communication paths. In such an instance, communication device 110 acts as a control point within a distributed network to handle signalling and data from stimulus device 130 to establish the communication link as requested by stimulus device 130. Such an embodiment is exemplified in the block diagram of FIG. 2, where requesting entity 202 may first access communication capabilities from control point (CP) 204 concerning the communication capabilities of CP 204 via control path 208. Once ascertained, one or more communication paths 210 may be instantiated as required. As discussed in more detail below, any number of technologies may be used to exchange communication capability information between a client and a control point.

Figure 3:
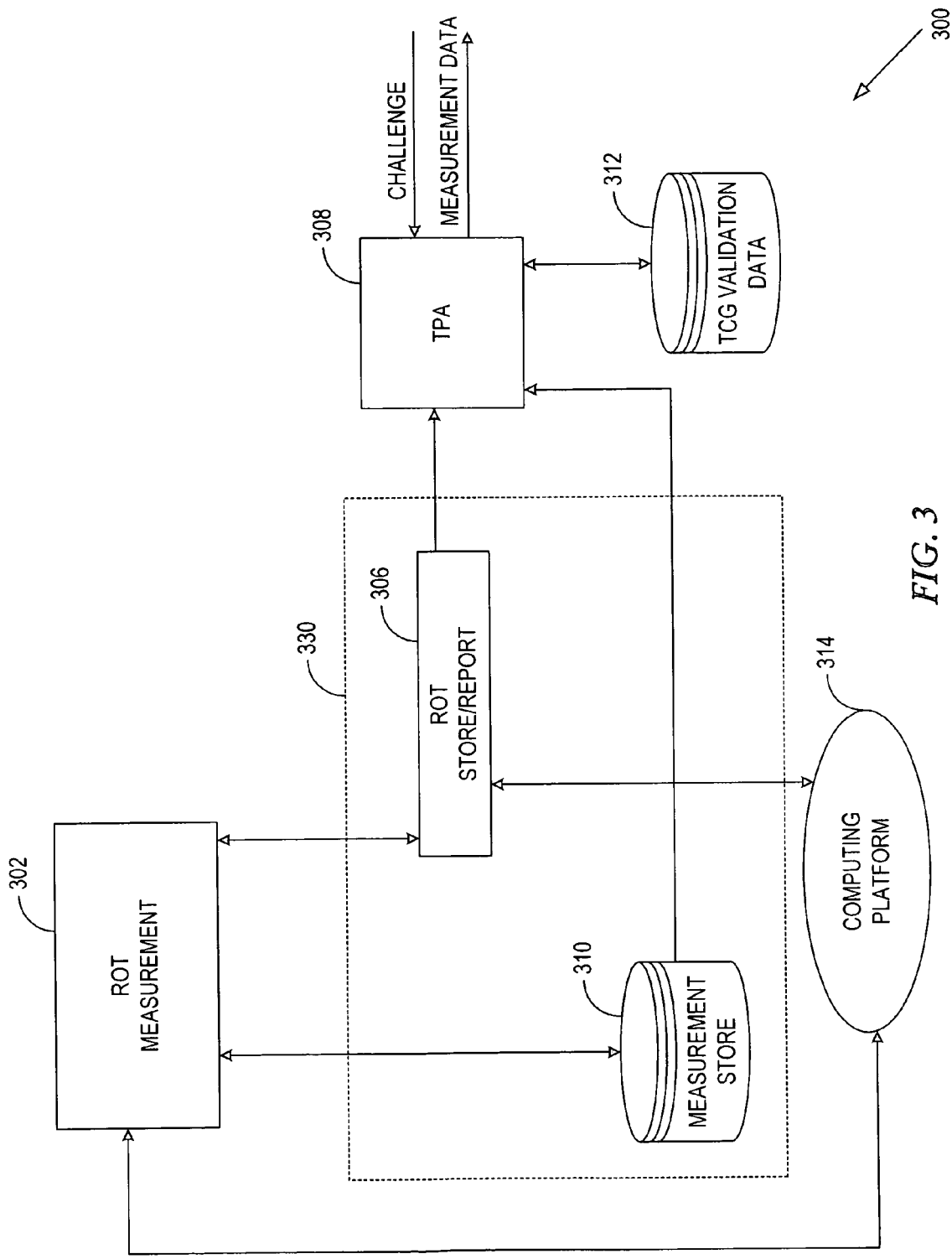
FIG. 3 illustrates an exemplary Trusted Platform Subsystem which may be used to discover a communication configuration of a client device.

In one embodiment, for example, a trust relationship between requesting entity 202 and CP 204 may be used for communication capability information, which is to be transferred via control path 208. In particular, a portion of CP 204 may represent a Trusted Platform Subsystem (TPS) 300 as exemplified in FIG. 3, which may be challenged by requesting entity 202 in order to obtain the communication capabilities existent within CP 204. TPS 300 enables requesting entity 202 to determine the state of the communication environment within CP 204 to deduce whether the level of communications available within CP 204 is acceptable to requesting entity 202.

TPS 300 provides reliable information via signal MEASUREMENT DATA of control path 208 to enable requesting entity 202 to deduce the communication environment(s) that are available within CP 204. TPS 300 operates with two roots of trust: Root of Trust (ROT) 302 for measuring integrity metrics; and ROT 306 for storing and reporting integrity metrics. ROT 302 measures certain platform characteristics, e.g., communication capabilities that may be implemented by CP 204, logs the measurement data into measurement store 310, and stores the final result in ROT 306.

When an integrity challenge, e.g., CHALLENGE, is received from requesting entity 202 via control path 208, Trusted Platform Agent (TPA) 308 gathers the final results from ROT 306, the log of measurement data from trusted platform measurement store 310, and Trusted Computing Group (TCG) validation data 312 that states the values that the measurements should produce in a platform that is working correctly. TPA 308 then sends the gathered data, e.g., MEASUREMENT DATA, to requesting entity 202 via control path 208, who then uses the data to check that it is consistent with the final results and then compares the data with the TCG validation data. This comparison allows requesting entity 202 to deduce the configured state of CP 204, via TPS 300, to subsequently decide whether it is satisfied to trust CP 204 for its intended purpose, e.g., to provide communications via path 210 in accordance with its communication environment capabilities. Once requesting entity 202 has determined that CP 204 can be trusted, requesting entity 202 may then request instantiation of data path 210 to conduct communications in accordance with the previously ascertained communication environment capabilities.

Figure 4:
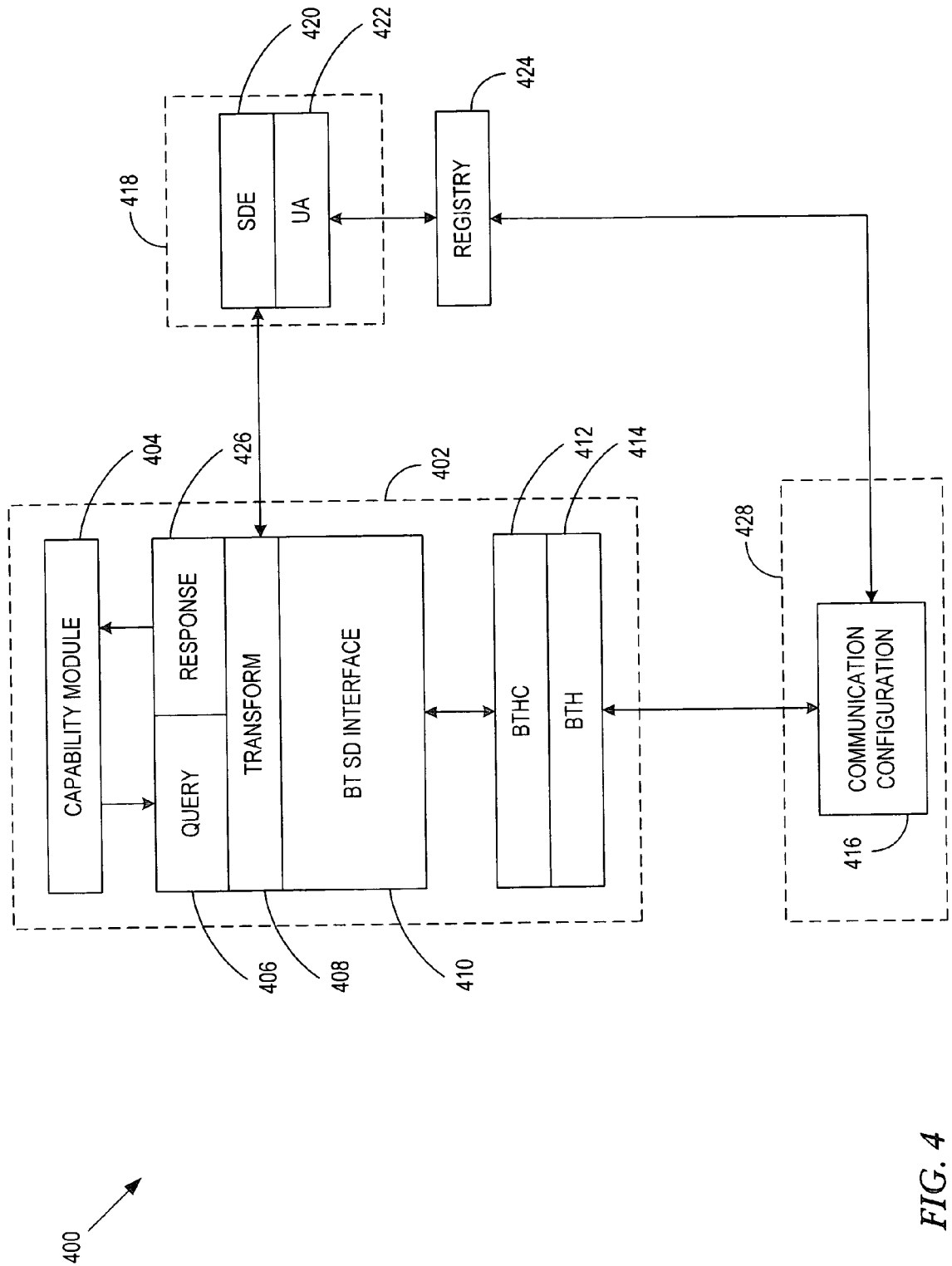
FIG. 4 illustrates an exemplary service discovery mechanism which may be used to discover a communication configuration of a client device.

In an alternate embodiment, the communication capabilities of CP 204 may be ascertained through a service discovery mechanism employed by requesting entity 202, which is exemplified as mobile, or non-mobile, device 402 of service discovery block diagram 400 of FIG. 4. While it is appreciated that any service discovery mechanism may be used by client 402, service discovery in accordance with the Bluetooth standard is discussed to facilitate an understanding of the present invention. In particular, either local or remote service discovery may be performed by client 402 to discover communication configuration 416 of CP 428.

Local service discovery of communication configuration 416 of CP 428 may be performed, for example, by client 402 via a query issued by query block 406, which is then optionally transformed by transform block 408 and forwarded by, e.g., Bluetooth Service Discovery (SD) interface 410. Once discovered, communication configuration 416 is then received by client 402 by performing a transform of the data received via transform block 408, formatting the response with response block 426, and ultimately providing the response to capability module 404 for a determination as to whether communication configuration 416 offered by CP 428 is suitable for use by client 402.

More particularly, communications between CP 428 and Bluetooth stack 412-414 is facilitated through the use of sockets, which are similar to those used by a TCP/IP connection. Bluetooth sockets are then used to discover other Bluetooth devices and services, such as communication configuration 416 of CP 428, and to read and write data over a Bluetooth radio interface. Prior to socket connection, however, service discovery must be performed in order to identify potential Bluetooth enabled devices/services that are available for subsequent connection. The Bluetooth SDP resident within BTHC 412 performs this task by performing two main functions: discovery of devices and services within the local area, and the advertisement of services from the local area to network host 418 that may be resident within, for example, network 206 of FIG. 2.

In one embodiment, communication configuration 416 is locally discovered via BTHC 412 of client 402 and is then made visible through transform 408 to Service Discovery Engine (SDE) 420. Accordingly, communication configuration 416 of CP 428 may be advertised in registry 424 by network host 418 via User Agent (UA) 422. In this way, the locally accessed communication configuration 416 is made accessible by client 402 to any other client within the domain of network host 418, which may be considering a communications link with CP 428 that is compatible with the communication environment defined by communication configuration 416.

In an alternate embodiment, remote service discovery of communication configuration 416 may be performed by client 402 in the event that CP 426 is not proximately located with client 402. In such an instance, communication configuration 416 of CP 428 is advertised within registry 424 by other means. Transform 408 may then access SDE 420 of network host 418 to discover communication configuration 416 that is stored in registry 424 and then forward communication configuration 416 onto capability module 404 via response module 426 for a determination as to whether the communication environment offered by CP 428 is suitable for use by client 402.

In an alternate embodiment, the communication capabilities of CP 204 may be ascertained via network discovery, whereby a single Internet Protocol (IP) address, a range of IP addresses, or IP addresses within an entire subnet may be discovered through TCP/IP connection 212 obtained between requesting entity 202 and network 206. In one embodiment, requesting entity 202 may operate a network management protocol, such as the Simple Network Management Protocol (SNMP), to manage one or more CPs as exemplified by CP 204. For each CP managed, a Management Information Base (MIB) written in Abstract Syntax Notation 1 (ASN. 1) may be used to extract any number of characteristics associated with the managed CP, such as the communication configuration capabilities of the managed CP. Each term in the MIB is represented as an object identifier (OID), which may further describe each communication parameter of the communication configuration associated with each managed CP.

Figure 5:
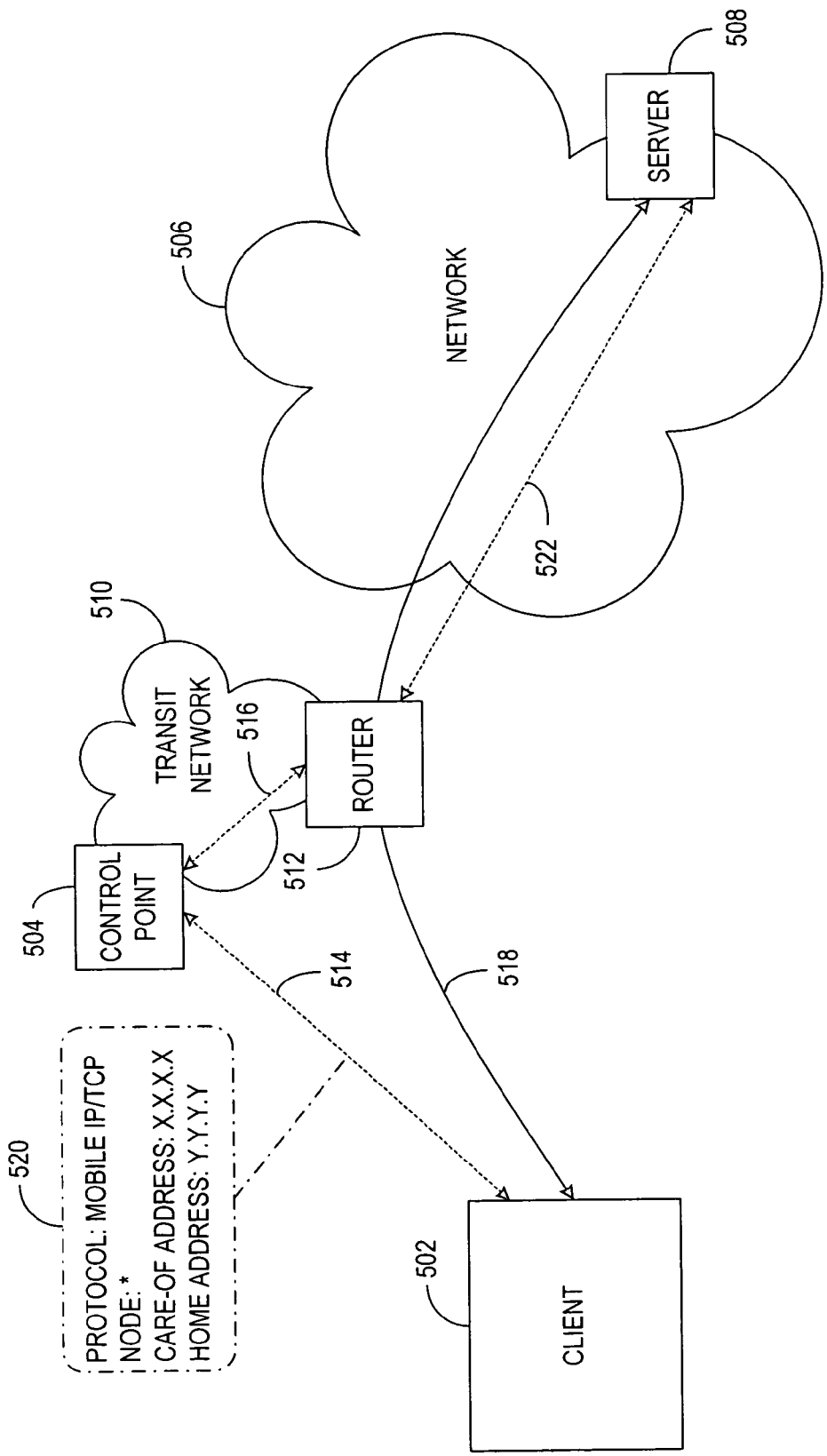
FIG. 5 illustrates an alternate communication block diagram in accordance with one embodiment of the present invention.

As discussed above, requesting entity 202 may query CP 204 as to its communication environment capabilities, whether CP 204 is proximately, or remotely, located in relation to requesting entity 202. Such a query establishes whether a communication link between requesting entity 202 and CP 204 may be established that is in conformance with the communication requirements of requesting entity 202. In an alternate embodiment, a requesting client may query the communication capabilities of a network entity that is separate to the CP, as exemplified in FIG. 5. In particular, client 502 may access CP 504 via control path 514 to assess the communication environment that may be instantiated within router 512 in order to accommodate one or more data paths 518 between client 502 and server 508 of network 506.

In particular, transit network 510 may consist of a plurality of mobile terminals, such as PDAs, laptop computers, cellular telephones, etc., that have mingled to form an ad-hoc network in the vicinity of router 512. Router 512 may provide IP access to network 506, but is ordinarily kept in a "sleep" mode until wakened by a trigger event in accordance with the present invention. For example, router 512 may have the capability to instantiate multiple TCP connections to network 506, but necessarily keeps the sockets that are used by the TCP connections in a closed state for security purposes, until such time that a socket is to be instantiated to facilitate a requested TCP connection. In an alternate embodiment, security may be implemented via a filter contained within router 514 that identifies IP headers contained within the packets/frames it receives. In such an instance, the TCP connections may be maintained in their open state, so long as router 514 continues to receive the required IP header information that is necessary to keep the TCP connection open.

As client 502 enters the vicinity of the ad-hoc network denoted by transit network 510, proximity connection 514 is established between client 502 and control point 504. A trigger signal is then sent from client 502 to control point 504, which among other components, contains communication parameters 520. Communication parameters 520 are transmitted by client 502 within the trigger signal, so that a definition of a minimally acceptable configuration for communication between client 502 and, for example, its home network server 508 via data path 518 may be established. As can be seen, communication parameters 520 identify that the Mobile IP communication protocol is to be used and that a care-of address is associated with mobile client 502. The communication node of communication parameters 520 is established as a wild card using, e.g., the symbol "*", thus indicating that the communication node does not matter so long as IP packets are routed to client 502 via its care-of address.

CP 504 then forwards communication parameters 520 to router 512 via control path 516 and waits for a response from router 512 as to its conformance with the request from client 502 and its ability to adhere to communication parameters 520 as requested. Should router 512 accept the request, it becomes an access point for client 502 by awakening the required sockets/ports as needed to support the Mobile IP connection as requested by client 502. Since Mobile IP has been requested by client 502, then in one embodiment, router 512 may advertise itself through a standard protocol, e.g., router advertisement, along with the care-of address of client 502 in order to apprise server 508 of the IP address that is to be used to get IP packets to client 502 from server 508. It should be understood that other mobility management protocols may also be used, such as MobileIPv6, IP-based International Mobile Telecommunications (IMT) Network Platform, and Host Identity Protocol (HIP).

In another embodiment, server 508 may be considered to be a home agent (HA) to client 502 and router 512 may be considered to be a foreign agent (FA) to client 502. In such an instance, router 512, acting on behalf of client 502 as its FA, sends a registration request with the care-of address information to the HA, e.g., server 508. Once server 508 receives the registration request, it may add the care-of address information to its routing table, approve the request, and send a registration reply back to router 512. In another embodiment, MobileIPv6 router 512 does not act as an FA to client 502. In such an instance, client 502 sends a registration request with the care-of address information to the HA, e.g., server 508. Once server 508 receives the registration request, it may add the care-of address information to its routing table, approve the request, and send a registration reply back to client 502.

To get an IP packet to client 502 from server 508 via data path 518, server 508 delivers the packet from network 506 to the advertised/registered care-of address as previously identified by communication parameters 520. In particular, the delivery requires that the IP packet be modified so that the care-of address appears as the destination IP address. This modification can be understood as a packet transformation or, more specifically, a redirection. Once the packet arrives at router 512, a reverse transformation is applied so that the packet once again appears to have the home address of mobile client 502, as identified by communication parameters 520, as the destination IP address. When the packet, addressed to the home address, arrives at client 502, it is processed properly by TCP or whatever higher level protocol logically receives it from the processing layer of mobile client 502.

Figure 6:
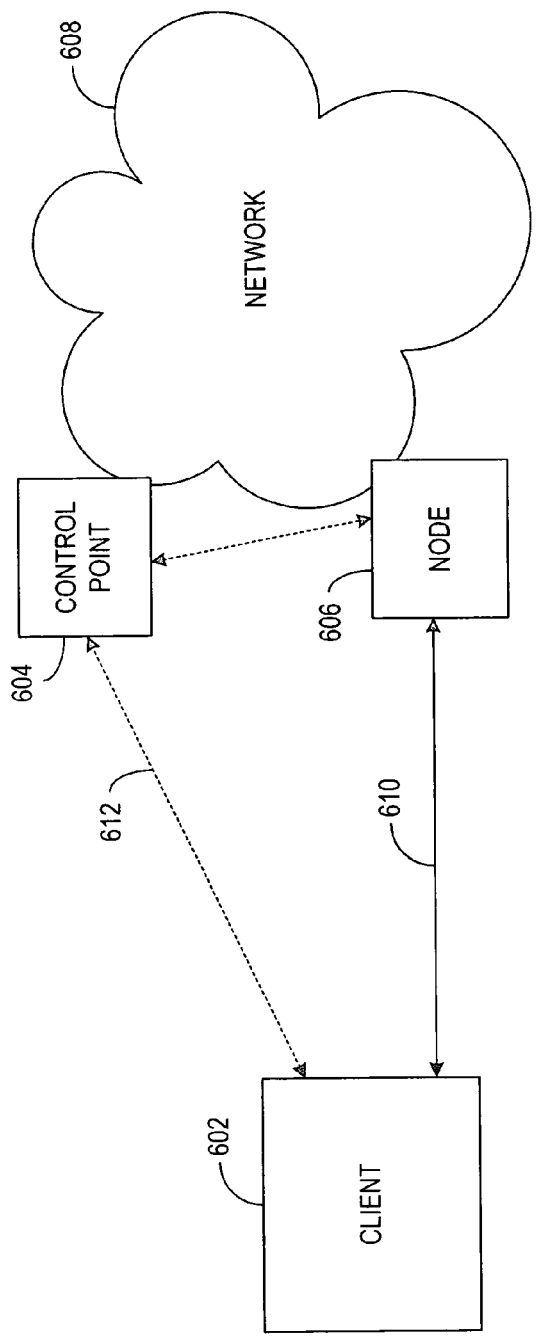
FIG. 6 illustrates an alternate communication block diagram in accordance with one embodiment of the present invention.

In an alternate embodiment as exemplified in FIG. 6, client 602 sends a trigger signal via control path 612 to CP 604. Once received, CP 604 triggers node 606, such that the appropriate access technology is activated (if possible) within node 606 as requested by client 602. Node 606 then replies to CP 604 as to the success of the access technology activation, which is then forwarded on to client 602. Once apprised of the successfully activated access technology, client 602 proceeds to communicate with access network 608 via node 606 and data path 610. In an alternate embodiment in which a fast response is desired/required, upon receipt of the trigger from CP 604, node 606 processes and validates the trigger and then replies to CP 604 as to the success of the received trigger. CP 604 then forwards the reply back to client 602 after which, the appropriate access technology is activated within node 606 so that communications via data path 610 may proceed.

Figure 7:
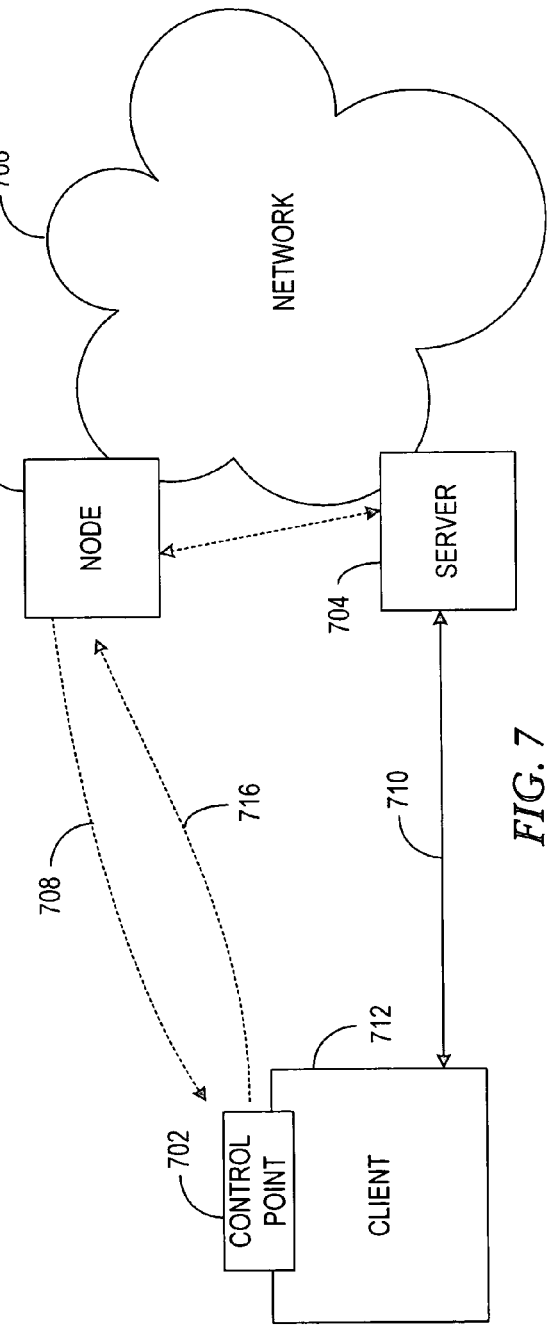
FIG. 7 illustrates an alternate communication block diagram in accordance with one embodiment of the present invention.

In an alternate embodiment, a control point may instead be resident within a client as exemplified in FIG. 7 and instructed to enable a specific access point with a specific access technology in order to access a particular service that may be offered by network 706. In such an instance, CP 702 is resident within client 712 and is informed by node 714 through control message 708 that a specific access technology is required to instantiate data path 710 with server 704. Once access technology message 708 is received from node 714, CP 702 responds with trigger signal 716 to node 714, which contains the communication configuration parameters as specified by node 714 in control message 708. Node 714 then responds with a wake up message to server 704, in which case the communication environment within server 704, as specified by the communication configuration parameters of control messages 708 and 716, is activated. The activation of the communication environment within server 704 may then be communicated to client 712 so that data path 710 may be instantiated.

Figure 8:
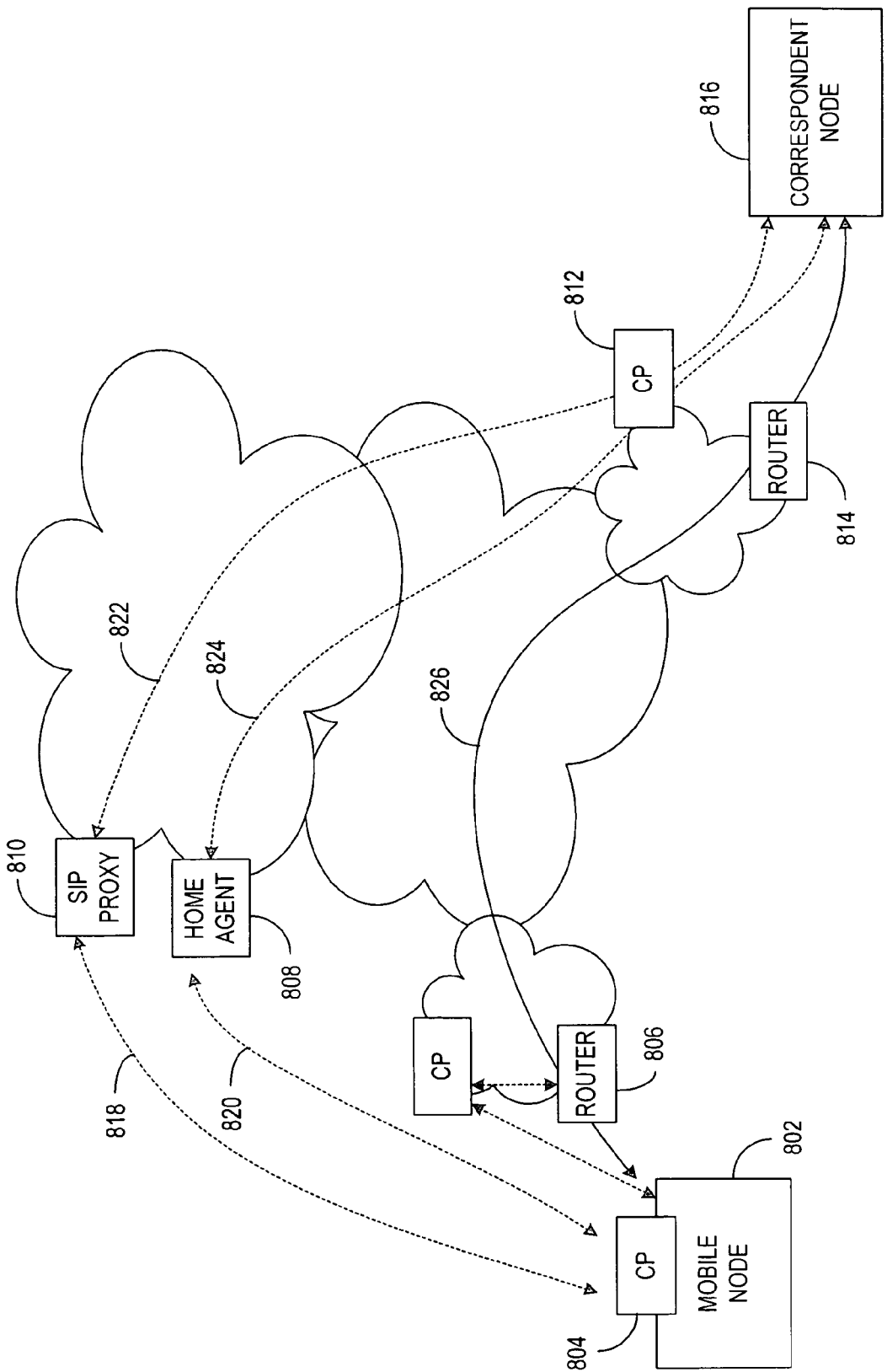
FIG. 8 illustrates an alternate communication block diagram in accordance with one embodiment of the present invention.

In an alternate embodiment, a coordinated wake-up network is distributed throughout several access networks and is exemplified in FIG. 8. In particular, mobile node (MN) 802 in combination with CP 804 may be operating in accordance Mobile IP procedures, in which case home agent (HA) 808 cooperates with CP 804 via control path 820 and CP 812 via control path 824 to activate an execution environment within correspondent node (CN) 816 in response to a trigger signal. In one embodiment, HA 808 is already familiar with the communication configuration of CN 816 and informs MN 802 of the communication configuration of CN 816 via control path 820. In response, MN 802 sends a trigger signal containing a compatible communication configuration via control path 820, which is then forwarded onto CP 812 and CN 816 via control path 824 to instantiate data path 826.

In an alternate embodiment, CP 804 may be operating within a General Packet Radio Service (GPRS) network, whereby the Session Initiation Protocol (SIP) may be implemented. In such an instance, CP 804 may instead transmit a SIP INVITE request to SIP proxy 810 via control path 818, which serves as a trigger stimulus to initiate data communications between MN 802 and CN 816 via data path 826. Within the SIP INVITE request, media negotiation may transpire to determine which, if any, of the communication environments within CN 816 may be wakened in response to the SIP INVITE request.

In particular, the SIP INVITE request may contain media negotiation using the Session Description Protocol (SDP), which is a text based language that may be used by CP 804 to define the particular communication configuration required. In response, CN 816, via CP 812, may send a 200 OK response via control path 822, in which either the communication configuration requested is a compatible configuration that may be instantiated within CN 816 to accommodate data path 826. Otherwise, a SIP response code class of 4xx (i.e., 400-499) may be returned by CN 816 should the communication configuration requested by MN 802 be impossible to implement within CN 816, thus denying instantiation of data path 826.

Figure 9:
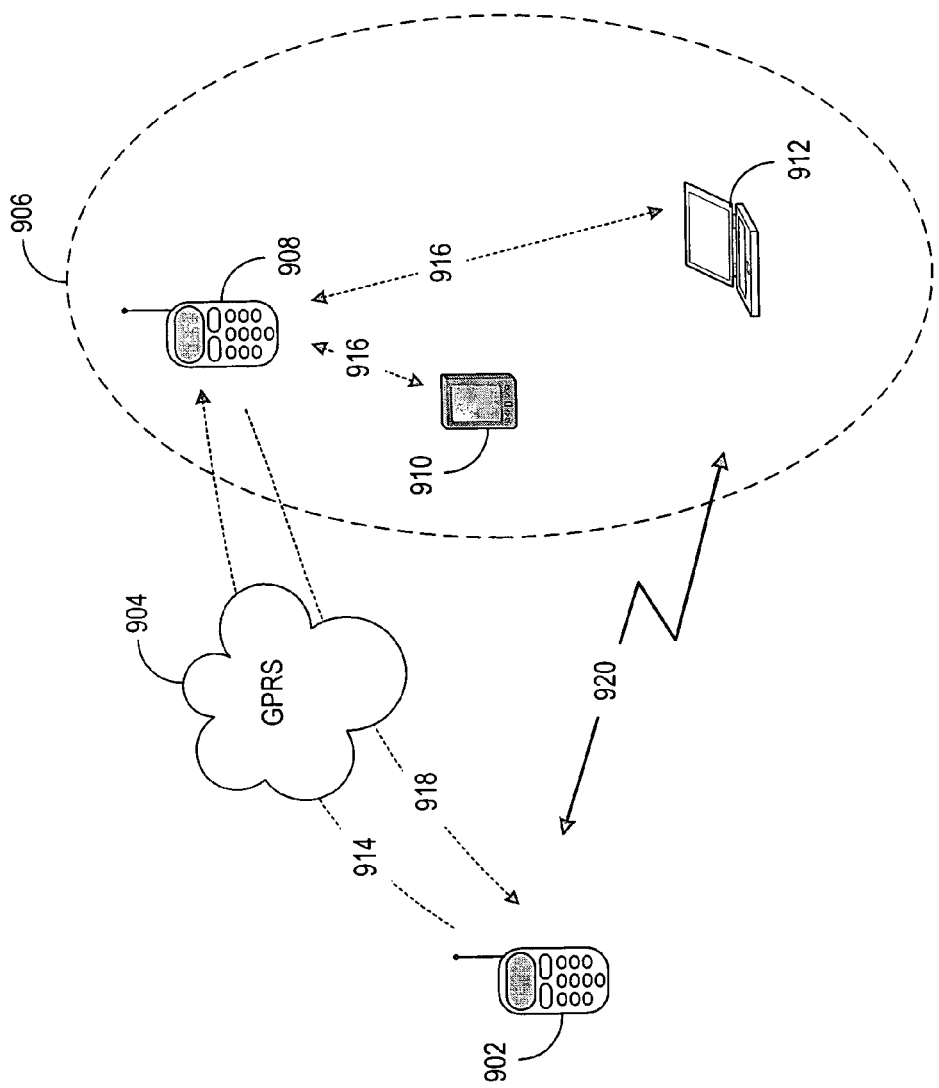
FIG. 9 illustrates an alternate communication block diagram in accordance with one embodiment of the present invention.

In an alternate embodiment as exemplified in FIG. 9, mobile terminals 902 and 908 may be operational within GPRS network 904 and may have additional proximity communication capabilities, such as Bluetooth and WLAN. Mobile terminal 908, via its Bluetooth functionality, may be a member of a Personal Area Network (PAN) 906, which includes PDA 910 and laptop 912. Trigger signal 914 may be transmitted from mobile terminal 902 to mobile terminal 908 via GPRS network 904. Within trigger signal 914, a communication configuration request may be provided, in which mobile terminal 902 designates a list of preferred communication protocols, or specific interfaces, to be used in communication with laptop 912 via wireless data path 920. If no such list is provided by mobile terminal 902, laptop 912 will activate all interfaces to provide access to mobile terminal 902. Depending upon the wireless configuration of laptop 912, one or more of the preferred communication protocols may be possible.

In addition to the communication configuration request, additional information such as authentication and authorization (AA) information may be delivered via trigger signal 914 to mobile terminal 908. Both the communication configuration request and the AA information of trigger signal 914 may be disseminated throughout PAN 906 via, e.g., Bluetooth signals 916. In response, mobile terminal 908, or alternately any one of the other members of PAN 906, may determine whether mobile terminal 902 is entitled to the requested configuration and whether laptop 912 may configure its execution environment to accommodate the request.

The results of the communication configuration and the AA information of trigger signal 914 may then be communicated to mobile terminal 902. In the event that the requested communication link is granted, laptop 912 activates its execution environment, e.g., a WLAN environment, to accommodate the communication requested by mobile terminal 902. Once mobile terminal 902 detects operation of the WLAN interface of laptop 912, data link 920 may be established. In the event that multiple modes of communication are possible between mobile terminal 902 and laptop 912, i.e., the list of preferred protocols listed in the communication configuration of trigger signal 914 overlaps more than one communication capability of laptop 912, then additional signalling via control path 914 may be required to select the one or more data paths 920 that are to be instantiated.

It should be noted that while network 906 may operate as a PAN, in another embodiment, network 906 may also operate as a BAN, or sensor network. In such an instance, network elements 908, 910, and 912 are replaced with sensors that may be embedded within clothing, equipment, facilities, or the environment. Such sensors may facilitate monitoring and control facilities that utilize low power signal processing, computation, and wireless networking capabilities.

Figure 10:
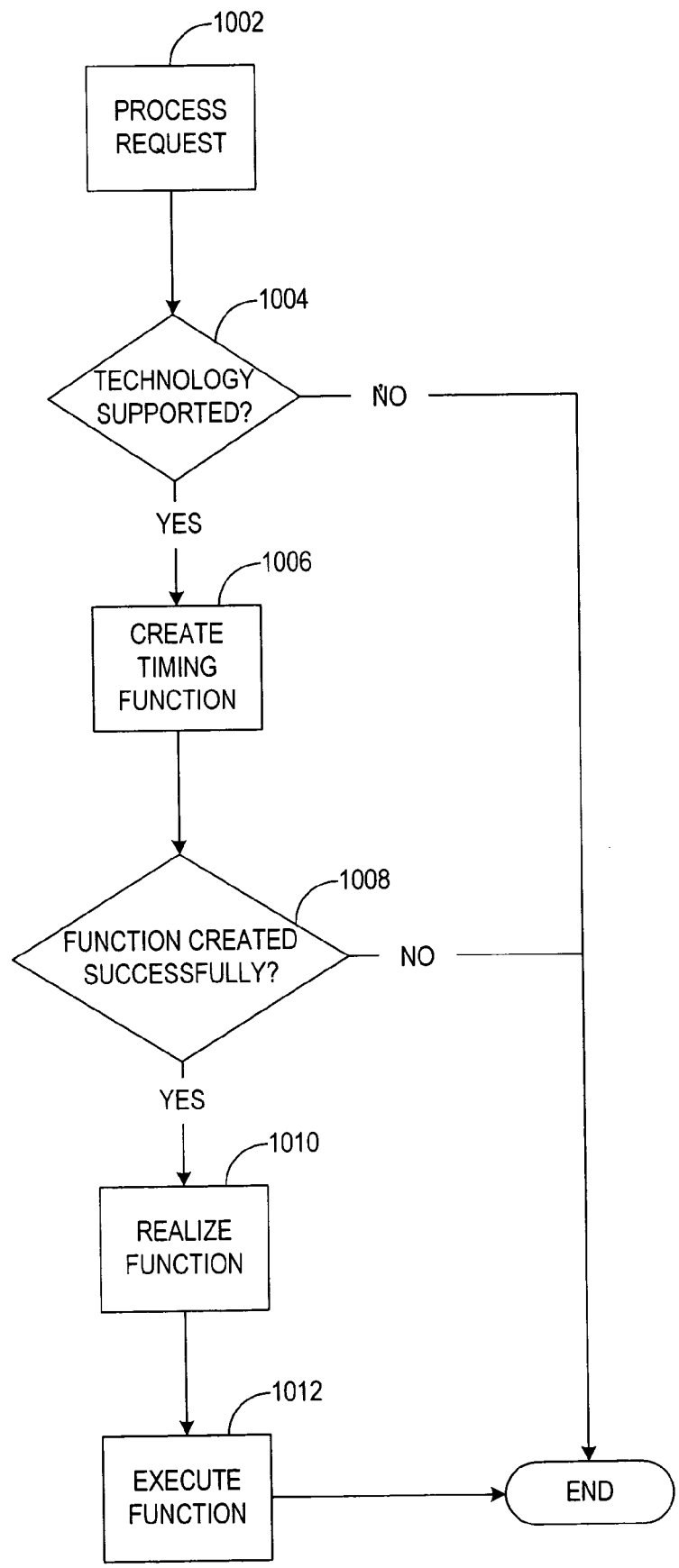
FIG. 10 illustrates an exemplary flow diagram of a method in accordance with the present invention.

A flow diagram of a method in accordance with the present invention is exemplified in FIG. 10. In step 1002, a trigger signal is received by a communication device from a client that is requesting a communication link to be established between the communication device and the client. In step 1004, the client determines whether a communication execution environment may be established that is compatible with the configuration information transmitted with the trigger signal. If not, then the flow terminates. Otherwise, a timing function as described in relation to FIG. 1B is applied in step 1006. The timing function may be a predetermined timing function, or conversely, it may be generated based upon the particular radio interface to be implemented. If application of the timing function is successful, as determined in step 1008, then the function is realized as in step 1010 and executed in step 1012 to instantiate the requested communication link between the client and the requesting communication device.

It should be noted, that the timing function as created in step 1006, may simply be a function that is dependent upon the duration of the communication link that is maintained by the communicating entities. That is to say, that the communication link may exist for the entire time that the communication entities require the link to be operational. In other embodiments, the timing function may only allow a predetermined amount of time in which the communicating entities may exchange data. In such an instance, the communication link is deactivated in accordance with the timing function.

Figure 11:
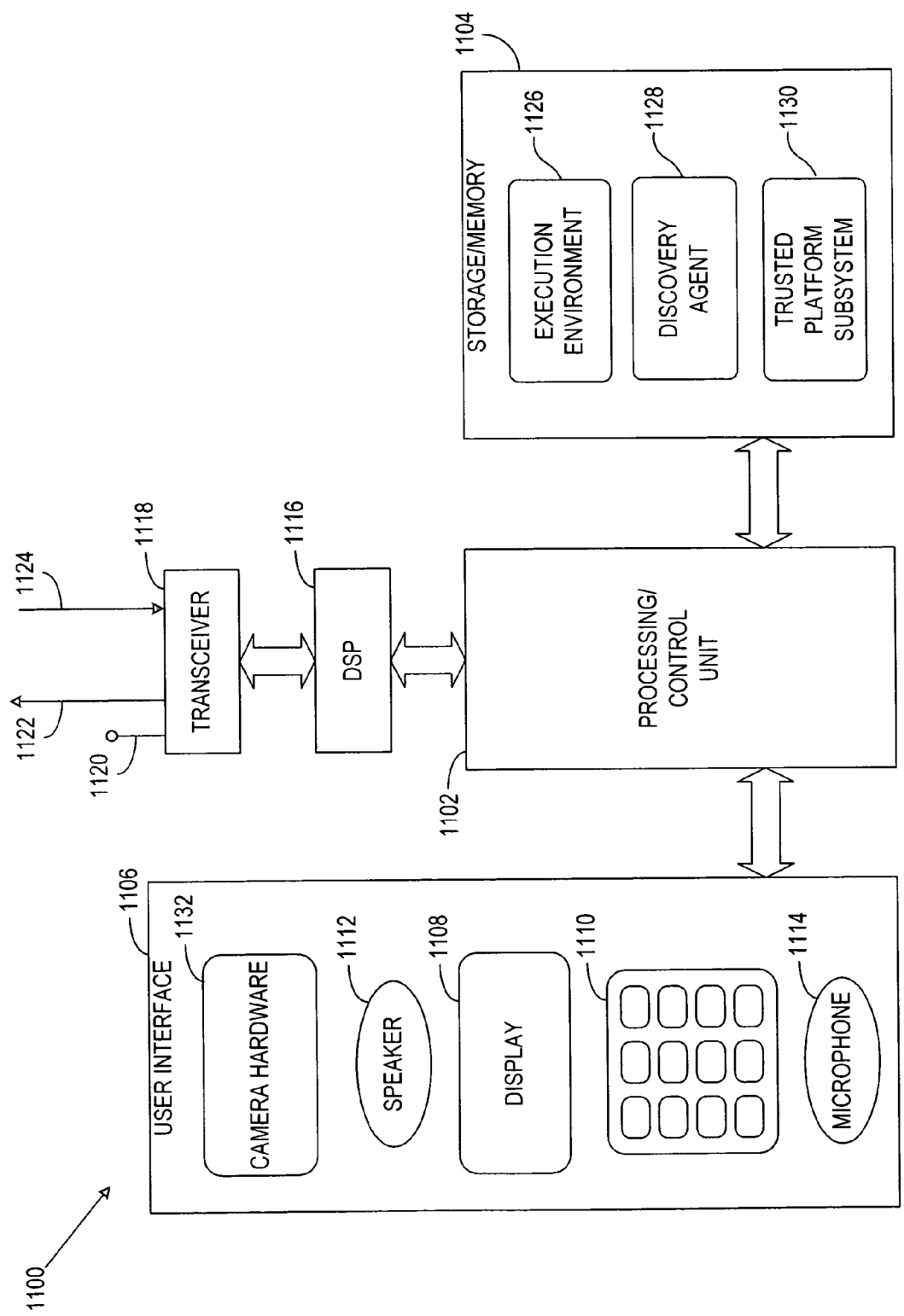
FIG. 11 illustrates a representative mobile computing arrangement suitable for communication functionality in accordance with the present invention.

The invention is a modular invention, whereby processing functions within either a mobile terminal or a hardware platform may be utilized to implement the present invention. The mobile terminals may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various communication functions described herein. An example of a representative mobile terminal computing system capable of carrying out operations in accordance with the invention is illustrated in FIG. 11. Those skilled in the art will appreciate that the exemplary mobile computing environment 100 is merely representative of general functions that may be associated with such mobile devices, and also that landline computing systems similarly include computing circuitry to perform such operations.

The exemplary mobile computing arrangement 1100 suitable for mobile communications in accordance with the present invention may be associated with a number of different types of wireless devices. The representative mobile computing arrangement 1100 includes a processing/control unit 1102, such as a microprocessor, reduced instruction set computer (RISC), or other central processing module. The processing unit 1102 need not be a single device, and may include one or more processors. For example, the processing unit may include a master processor and associated slave processors coupled to communicate with the master processor.

The processing unit 1102 controls the basic functions of the mobile terminal, and also those functions associated with the present invention as dictated by execution environment 1126, discovery agent 1128, and TPS 1130 that is available in the program storage/memory 1104. Thus, the processing unit 1102 in conjunction with execution environment 1126 is capable of instantiating a communication link with another mobile or non-mobile communication device in response to a trigger signal sent by the communication device. In addition, the communication configuration of the mobile terminal may be discovered through cooperation between the processing unit 1102, the discovery agent 1128, and TSS 1130 as discussed herein. The program storage/memory 1104 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 1104 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 1100 via data signals, such as being downloaded electronically via one or more networks, such as the Internet and an intermediate wireless network(s).

The processor 1102 is also coupled to user-interface 1106 elements associated with the mobile terminal. The user-interface 1106 of the mobile terminal may include, for example, a display 1108 such as a liquid crystal display, a keypad 1110, speaker 1112, camera hardware 1132, and microphone 1114. These and other user-interface components are coupled to the processor 1102 as is known in the art. Other user-interface mechanisms may be employed, such as voice to command converters, text to voice converters, switches, touch pad/screen, graphical user interface using a pointing device, trackball, joystick, or any other user interface mechanism.

The mobile computing arrangement 1100 also includes conventional circuitry for performing wireless transmissions. A digital signal processor (DSP) 1116 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1118, generally coupled to an antenna 1120, transmits the outgoing radio signals 1122 and receives the incoming radio signals 1124 associated with the wireless device.

The mobile computing arrangement 1100 of FIG. 11 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a communication system and method in accordance with the present invention.

Figure 12:
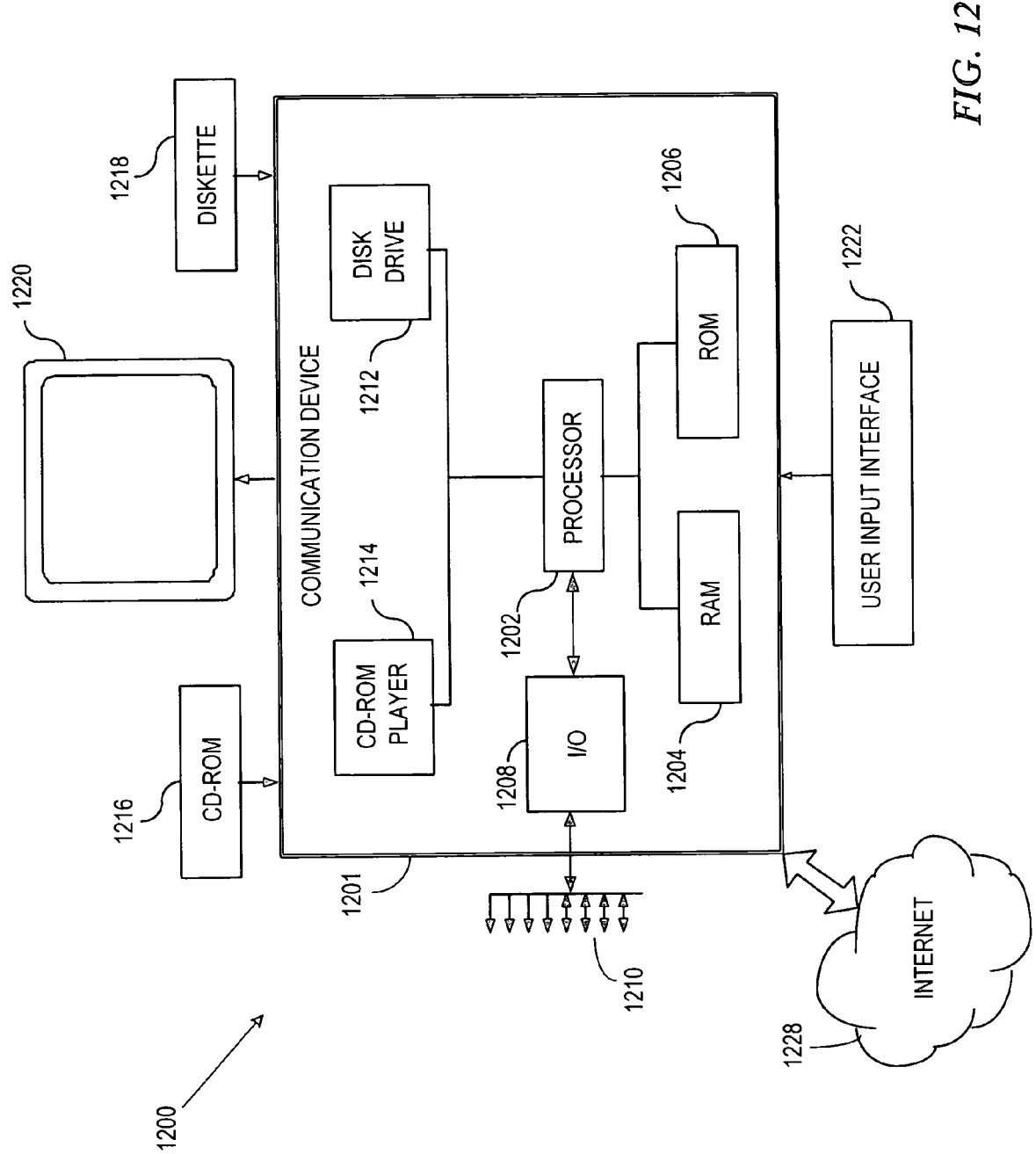
FIG. 12 is a representative computing system capable of carrying out communication functions according to the present invention.

The non-mobile communication devices or other systems for providing communication functions in connection with the present invention may be any type of computing device capable of processing and communicating digital information. The communication device platforms utilize computing systems to control, host, and manage the communication activity. An example of a representative computing system capable of carrying out operations in accordance with the invention is illustrated in FIG. 12. Hardware, firmware, software or a combination thereof may be used to perform the various communication functions and operations described herein. The computing structure 1200 of FIG. 12 is an example computing structure that can be used in connection with such a communication device.

The example computing arrangement 1200 suitable for performing the communication activity in accordance with the present invention includes communication device 1201, which includes a central processor (CPU) 1202 coupled to random access memory (RAM) 1204 and read-only memory (ROM) 1206. The ROM 1206 may also be other types of storage media to store programs, such as programmable ROM (PROM), erasable PROM (EPROM), etc. The processor 1202 may communicate with other internal and external components through input/output (I/O) circuitry 1208 and bussing 1210, to provide control signals and the like. For example, data received from I/O connections 1208 or Internet connection 1228 may be processed in accordance with the present invention. External data storage devices may be coupled to I/O circuitry 1208 to facilitate communication functions according to the present invention. Alternatively, such databases may be locally stored in the storage/memory of gateway 1201, or otherwise accessible via a local network or networks having a more extensive reach such as the Internet 1228. The processor 1202 carries out a variety of functions as is known in the art, as dictated by software and/or firmware instructions.

Communication device 1201 may also include one or more data storage devices, including hard and floppy disk drives 1212, CD-ROM drives 1214, and other hardware capable of reading and/or storing information such as DVD, etc. In one embodiment, software for carrying out the communication operations in accordance with the present invention may be stored and distributed on a CD-ROM 1216, diskette 1218 or other form of media capable of portably storing information. These storage media may be inserted into, and read by, devices such as the CD-ROM drive 1214, the disk drive 1212, etc. The software may also be transmitted to gateway 1201 via data signals, such as being downloaded electronically via a network, such as the Internet. Communication device 1201 is coupled to a display 1220, which may be any type of known display or presentation screen, such as LCD displays, plasma display, cathode ray tubes (CRT), etc. A user input interface 1222 is provided, including one or more user interface mechanisms such as a mouse, keyboard, microphone, touch pad, touch screen, voice-recognition system, etc.

Communication device 1201 may be coupled to other computing devices, such as the landline and/or wireless terminals via a network. The gateway may be part of a larger network configuration as in a global area network (GAN) such as the Internet 1228, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method comprising:
   receiving, at a client entity via a control path, a trigger signal sent by a requesting entity;
   analyzing communication link definitions contained within the trigger signal to determine compatibility of an execution environment of the client entity with the communication link definitions;
   applying a timing function in response to a positive determination of compatibility;
   activating the execution environment to instantiate operation of at least one communication link in accordance with the communication link definitions and the timing function, wherein the at least one communication link is separate from the control path between the requesting entity and the client entity; and
   deactivating the at least one communication link in accordance with the timing function.

2. The method of claim 1, wherein the communication link definitions comprise at least one communication link requested, wherein the communication parameters include a definition of a communication protocol and a communication medium.

3. The method of claim 2, wherein analyzing the communication link definitions comprises generating a second set of communication parameters relating to the client entity, the second set of communication parameters defining communication capabilities within the client entity.

4. The method of claim 3, wherein generating a second set of communication parameters comprises:
   receiving a Radio Frequency Identification (RFID) signal to activate an RFID tag located within a control point associated with the client entity; and
   transmitting the second set of communication parameters from the RFID tag in response to activating the RFID tag with the transmitted RFID signal.

5. The method of claim 3, wherein generating the second set of communication parameters comprises transmitting a communication configuration relating to the client entity using a Bluetooth connection.

6. The method of claim 3, wherein generating the second set of communication parameters comprises advertising a communication configuration relating to the client entity to a registry via a service discovery engine (SDE).

7. The method of claim 3, wherein generating the second set of communication parameters comprises transmitting a communication configuration relating to the client entity using a network management protocol.

8. The method of claim 3, wherein generating the second set of configuration parameters comprises:
   creating a trusted platform subsystem (TPS) within the control point; and
   responding to TPS challenges from within the control point to transmit the second set of configuration parameters.

9. The method of claim 3, wherein analyzing communication parameters comprises comparing those communication parameters that exist in both the first set and the second set of communication parameters.

10. The method of claim 1, wherein receiving the trigger signal comprises receiving the trigger signal by a control point that is coexistent with the client entity.

11. The method of claim 1, wherein receiving the trigger signal comprises receiving the trigger signal by a control point that is separate from the client entity.

12. The method of claim 11, wherein receiving the trigger signal comprises registering the trigger signal from the requesting entity to the control point, wherein the requesting entity operates according to a mobile internet protocol (MobileIP).

13. The method of claim 12, wherein registering the trigger signal further comprises signaling a portion of the trigger signal from the control point to a home agent (HA) operating in conjunction with the requesting entity.

14. The method of claim 12, wherein registering the trigger signal further comprises advertising a portion of the trigger signal from the control point via a router advertisement.

15. The method of claim 11, wherein receiving the trigger signal comprises receiving a session initiation protocol (SIP) message by the control point, wherein the control point operates as a SIP proxy.

16. The method of claim 15, wherein receiving the SIP message comprises including a session description protocol (SDP) message within the SIP message, wherein the SDP message forms the communication parameters.

17. The method of claim 11, wherein receiving the trigger signal comprises receiving the trigger signal from a member of a personal area network (PAN).

18. The method of claim 17, further comprising propagating the trigger signal to other members of the PAN, wherein one of the other members of the PAN operates as the client entity.

19. The method of claim 1, wherein establishing the timing function comprises:
establishing a start time for the communication link to become active; and establishing a stop time for the communication link to become inactive.

20. The method of claim 1, wherein the positive determination of compatibility is generated by the client entity and transmitted to the requesting entity in response to receiving the trigger signal.

21. The method of claim 1, wherein activating the communication link comprises transitioning the communication link from a powered-off state to a powered-on state in response to an activation signal of the timing function.

22. The method of claim 1, wherein deactivating the communication link comprises transitioning the communication link from a powered-on state to a powered-off state in response to a deactivation signal of the timing function.

23. A client device comprising:
an interface configured to receive a trigger signal to activate at least one communication link;
a receiver coupled to the interface and configured to parse the trigger signal to obtain communication configuration parameters associated with the at least one communication link;
an execution environment coupled to the receiver and configured to instantiate operation of the at least one communication link in accordance with the communication configuration parameters, wherein the at least one communication link is activated from a previously deactivated state;
a database configured to store one or more communication configurations instantiable by the execution environment; and
a logic block coupled to the database and the receiver and configured to compare the communication configuration parameters to the instantiable communication configurations to determine compatibility.

24. The client device of claim 23, wherein the interface is configured to receive the trigger signal from wireless media.

25. The client device of claim 23, wherein the interface is configured to receive the trigger signal from wired media.

26. The client device of claim 23, further comprising: a timer block configured to generate a timing signal; and a trigger block coupled to the logic block and the timer block and configured to generate an activation signal in response to the timing signal and a positive determination of compatibility.

27. The client device of claim 23, further comprising a capability module coupled to the interface and the database and configured to provide the one or more communication configurations instantiable by the execution environment in response to a configuration request received from the interface.

28. The client device of claim 27, wherein the interface comprises a radio frequency identification (RFID) tag coupled to the capability module and configured to transmit the one or more communication configurations instantiable by the execution environment in response to the configuration request.

29. A non-transitory, computer-readable medium having instructions stored thereon which are executable by a processor of a communication device for performing:
receiving, via a control path, a trigger signal containing communication link definitions from a requesting entity to activate a communication link, wherein the communication link is separate from the control path between the requesting entity and the communication device;
parsing the communication link definitions to obtain a preferred communication configuration;
comparing the preferred communication configuration to a set of predetermined communication configurations associated with an execution environment; and
initiate a timing function that activates the execution environment to instantiate the the communication link in response to a positive comparison between the preferred communication configuration and the set of predetermined communication configurations.

30. The computer-readable medium of claim 29 further comprising instructions to perform:
receiving a request to provide the set of predetermined communication configurations; and
transmitting the set of predetermined communication configurations in response to the received request.

31. A communication device, comprising:
an interface configured to receive a trigger signal containing communication link definitions;
a receiver coupled to the interface and configured to parse the communication link definitions;
a logic block coupled to receive the parsed communication link definitions and configured to compare the communication link definitions to communication configuration capabilities associated with an execution environment; and
a timer block coupled to the logic block, wherein the timer block initiates a timing function that activates the execution environment in response to a positive match between the communication configuration capabilities and the communication link definitions.

32. The communication device of claim 31, wherein the interface includes a wireless interface.

33. The communication device of claim 32, wherein the wireless interface includes one or more of a Wireless Local Area Network (WLAN), Bluetooth, Near-Field Communication (NFC), Radio Frequency Identification (RFID), and Short Messaging Service (SMS) interface.

34. The communication device of claim 31, wherein the interface includes a wired interface.

35. The communication device of claim 34, wherein the interface includes one or more of a IEEE 1394 and a Universal Serial Bus interface.

36. The communication device of claim 31, further comprising a capability module coupled to receive the communication configuration capabilities and configured to provide the communication configuration capabilities to the logic block.

37. The communication device of claim 31, wherein the execution environment resides within the communication device.

38. The communication device of claim 37, wherein the execution environment includes at least one communication medium and one communication protocol activated in response to the timing function.

39. The communication device of claim 31, wherein the execution environment resides external to the communication device.

40. The communication device of claim 39, wherein the execution environment resides within one or more device external to the communication device and includes at least one communication medium and one communication protocol activated in response to the timing function.

* * * * *